…

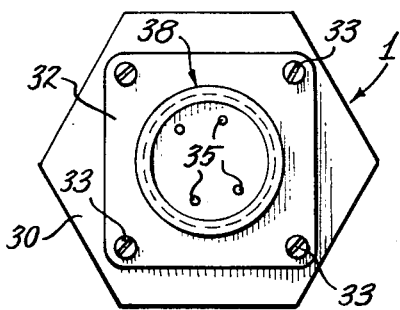
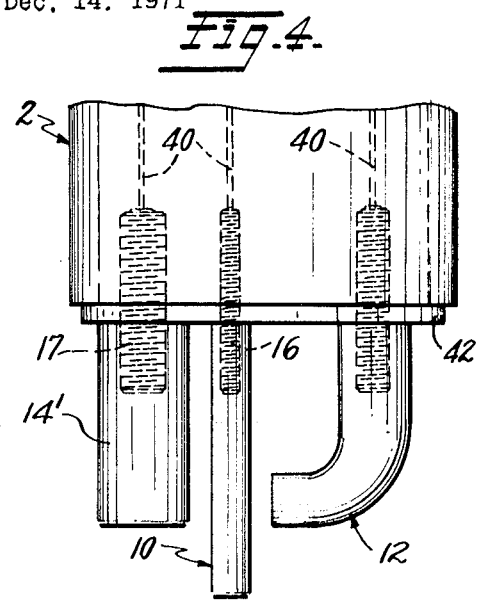
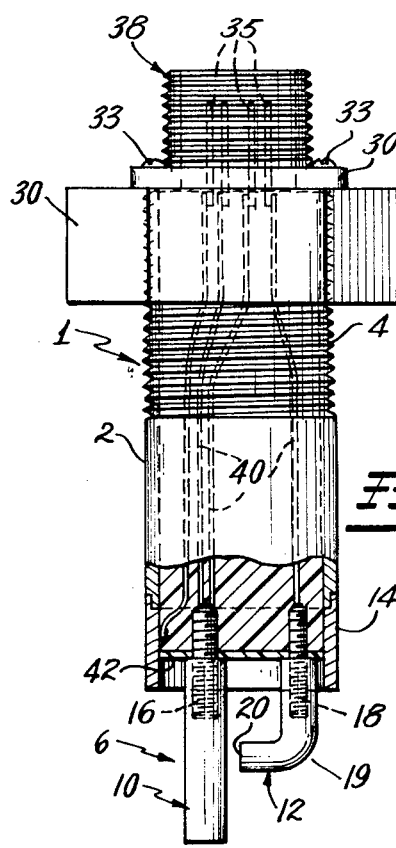
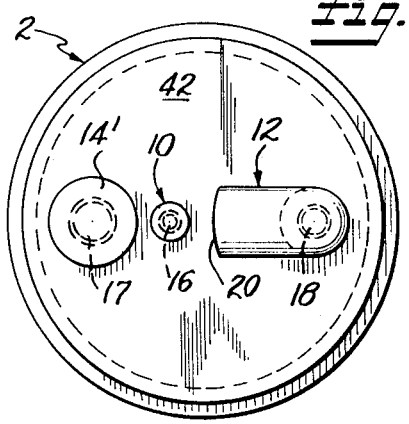
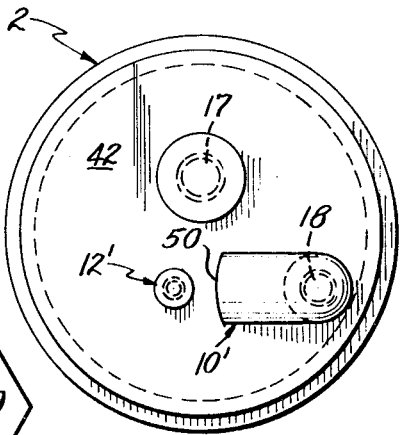
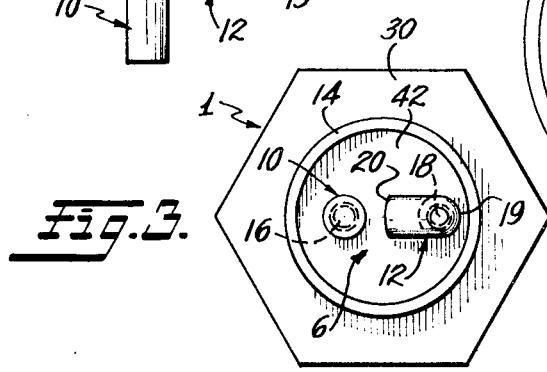

United States Patent Office 3,748,247
Patented July 24, 1973

3,748,247
CORROSION PROBE ASSEMBLY
Aaron Weisstuch, Yardley, Pa., assignor to Betz
Laboratories, Inc., Trevose, Pa.
Filed Dec. 14, 1971, Ser. No. 207,887
Int. Cl. G01n 27/30
U.S. Cl. 204—195 C                10 Claims

ABSTRACT OF THE DISCLOSURE

A corrosion probe assembly for measuring corrosion rates of metallic electrodes in corrodant electrolyte solutions. The probe is designed for simplicity of construction and serviceability, and comprises a reference electrode bent at substantially a right angle to bring it into close proximity with a test electrode. This electrode design permits a minimum solution IR drop in the corrodant electrolyte, and it allows accurate corrosion rate measurements in electrolytes of high resistivity.

BACKGROUND OF THE INVENTION

Field of the invention

The invention relates to a corrosion meter probe used in polarization measurements of corrosion rates of metallic material upon exposure to a corrodant electrolyte.

Description of the prior art

Corrosion probes for electrochemical type corrosion meters are employed in determining corrosion rates of metallic materials by the action of corrodants. The measurements are useful in determining the effect of different corrodant inhibitors upon a given test material. Likewise, these same probes may be used to measure the corrosion rates of different test electrodes in a given electrolyte. Corrosion probes are used in oil and gas wells and in pipelines of process industries such as refineries. They are also employed to study the effect of gasoline and coolant electrolytic solutions upon exposed materials.

Probe assemblies are usually designed to be easily fitted into the pipe system of the corrodant electrolytes. Examples of such probes are shown in the Annand Pat. No. 3,486,996, Wilson Pat. No. 3,558,462 and Winslow, Jr. Pat. No. 3,491,012. The probe assembly may be treated as a regular pipe fitting; therefore, no special tools or replacement techniques are needed.

Probe assemblies generally utilize a test, reference and auxiliary electrode. A small electric current is passed through the corrodant between the test and auxiliary electrodes while the polarizing potential between the test and reference electrodes is measured. The amount of current needed to maintain the polarizing potential at a predetermined small value, usually on the order of 10 mv., is directly proportional to the corrosion rate of the test electrode. Thus, a low corrosion rate corresponds to a small current flow needed to polarize the test electrode. However, if the corrosion rate is large, a corresponding large current flow is needed to polarize the test electrode. A measure of the polarizing current is effectively a measure of the corrosion rate.

OBJECTS AND SUMMARY

The probe of the instant invention is of simple design and may be easily manufactured without the expense necessitated by the more complex probes as exemplified in the prior art. As illustrated in Pat. No. 3,558,462, glass insulation elements are utilized to surround the electrodes and keep them electrically insulated from the housing and from each other. These glass elements must be secured in a sleeve and must have the proper bore diameter to receive the electrodes. The sleeve members themselves are then screwed into separate passageways through the housing of the probe.

The probe of the instant invention is much simpler in design and does not require the use of individual insulating elements for each of the electrodes. Instead of individual insulating elements, an epoxy potting material is poured within the probe housing to both rigidly secure and insulate the electrode supporting elements. By using the potting material, the supporting elements need not be accurately positioned within the housing, and passageways need not be drilled into the probe housing.

Another feature of the design of the probe in the instant invention is directed toward minimizing the solution IR drop in the electrolyte. It is desirable that the measured potential between the test and reference electrode is a function of the electrode/electrolyte interfaces but not of the IR drop within the corrodant electrolyte itself. No such consideration has been given in the prior are teachings. In effect, the probe design of the invention attempts to minimize this solution IR drop by bending the reference electrode to bring it in close proximity to the test electrode. In this way it is possible to accurately measure corrosion rate even in electrolytes of high resistivity.

The electrodes of probe assemblies are usually made of the same conducting material and have the same exposed surface areas. The identity of the electrode composition and structure in the prior art probes is necessitated by the requirement of having a small potential difference between the test and reference electrodes. In this way the voltage measurement between the test and reference electrodes can be made more sensitive and given an optimum response to the small 10 mv. polarizing potential. This is especially true when a voltmeter is used to measure the potential difference.

In the probe of the instant invention, it is not necessary that the electrodes be identical either in exposed surface area, shape or composition of conducting material. Indeed, it is even desirable that these electrodes be made according to a different geometry to aid in distinguishing the three electrodes from one another. It is also desirable that different probe material be used. Thus, one may select the reference and auxiliary electrodes from the viewpoint of long serviceability. While it may be necessary to change the test electrode after numerous measurements, the reference and auxiliary electrodes may be made of highly corrosive resistant materials with respect to the given electrolyte so as to require infrequent replacement. As an example, if the test electrode is a mild steel, it may be desired to select a stainless steel or copper conducting material for use in the reference and auxiliary electrodes. It is also possible for all three electrodes to be made of different conducting materials.

While the three electrodes may be made according to different geometries and materials, they may also be identical if desired, say, for symmetry reasons. The important point is that no careful surface area requirement or composition of the reference and auxiliary electrodes need be imposed. This allows a great reduction in manufacturing cost and an increase in service life of the probe.

The non-identical electrode structure of the present probe is designed for use in the corrosion meter system of copending application Ser. No. 154,770, filed June 21, 1971. In this system a capacitor is utilized to measure the polarizing potential between the test and reference electrodes, instead of high input impedance voltmeters found in prior art teachings. As more fully explained in the copending application, the charge built up on the capacitor corresponds to the exact voltage difference between the test and reference electrodes, and the need for identical electrodes is obviated.

An object of the invention is to provide a corrosion probe which is simple in construction and easily manufactured with a minimum of cost and machining.

Another object of the invention is to remove the necessity of using individual insulating elements around each of the electrodes.

A further object of the invention is to provide a corrosion probe which insures a minimum solution IR drop between the test and reference electrodes, thus extending the usefulness and accuracy of the corrosion rate measurements to corrodants of high resistivity.

Another object of the invention is to provide a probe design which optimizes the serviceability of the electrodes.

In accordance with the invention there is provided a corrosion probe assembly for measuring the corrosion rate of a test electrode in a corrodant electrolyte. The reference and auxiliary electrodes may be of different physical geometry and composition. The solution IR drop between the test electrode and reference electrode is minimized by the design of a bend in the reference electrode to bring it in close proximity to the test electrode. The simple design of the corrodant probe permits the electrodes to be easily secured within the probe and at the same time electrically insulated from each other.

BRIEF DESCRIPTION OF THE DRAWINGS

The invention is best described by reference to the drawings wherein:

FIG. 1 is a top plan view of one embodiment of the invention;

FIG. 2 is a side elevation view of the probe assembly shown in FIG. 1;

FIG. 3 is a bottom plan view of the probe assembly shown in FIG. 1;

FIG. 4 is a side elevation view of a second embodiment of the invention showing the bottom half of the probe assembly;

FIG. 5 is a bottom plan view of the probe assembly of FIG. 4; and

FIG. 6 is a bottom plan view of a third embodiment of the invention.

DETAILED DESCRIPTION OF THE DRAWINGS

A first embodiment of the invention is shown in FIGS. 1, 2 and 3. A probe 1 comprises a cylindrical housing 2 having an upper threaded portion 4 and a lower electrode portion 6. The threaded upper portion may be of 1" NPT thread suitable for screwing the probe body into a standard pipe T-section (not shown) through which the corrodant fluid is passed. The probe housing or body 2 may be fabricaetd from any non-corrosive metal alloy or plastic material which has suitable mechanical and chemical properties for the specific corrodant under test. A housing formed of PVC (polyvinyl chloride) is satisfactory for a wide range of corrodants.

The lower portion 6 of the probe contains a first test electrode 10, and a second reference electrode 12 and a third auxiliary electrode 14.

The test electrode 10 is shown as a cylindrical rod extending below the probe body and secured to the probe by means of a non-corrodible metallic threaded stud 16. The test electrode is usually composed of a mild steel whose corrosion rate is to be determined. Any convenient cross section or surface area may be selected as long the corrosion meter has been calibrated for the geometry employed.

The reference electrode 12 extends below the probe body and is secured thereto by a second threaded stud 18 which is of different diameter than the first stud 16. The use of different diameter studs is a matter of convenience and prevents confusing the test and reference electrode positions during replacement or maintenance operations. The reference electrode may be fabricated from any non-corrodible metal and does not have to be of the same composition as the test electrode. The reference electrode is usually selected to have a long service life with respect to the corrodant in use. Copper or stainless steel are quite satisfactory. The reference electrode 12 contains a right angle bend 19 which brings the end surface 20 of electrode 12 into close proximity with the surface of test electrode 10. Both the test and reference electrodes are tapped at one end to mate with the corresponding threaded studs 16 and 18. The relative position of electrodes 10 and 12, as better seen in FIG. 3, is achieved when both electrodes are screwed tightly upon their respective studs. The short distance between the electrodes permits a more accurate measurement of the corrosion rate since a minimum solution IR drop occurs between electrodes 10 and 12. This geometry permits the use of corrodant electrolytes having a very low electrical conductivity.

A third or auxiliary electrode 14 is formed from a non-corrosive metal as is the reference electrode. A stainless steel auxiliary electrode may be used together with a copper referenece electrode and a mild steel test electrode. Thus, all three electrodes may be of different compositions. As illustrated in FIGS. 1 and 3 the auxiliary electrode 14 is in the shape of a ring or shroud which may be pressure fitted or screw fed over the lower end of body 2. This electrode extends beyond the edge of the body 2 so as to be exposed to the corrodant together with test electrode 10 and reference electrode 12.

Secured to the upper portion 4 of probe 1 is a hexagonal section 30 which may be used with a standard pipe wrench to tighten body 2 into the desired pipe fitting. As shown in FIG. 2, an electrical connector member 32 is mounted on top of section 30 by means of screws 33. A plurality of pin connectors 35 are provided in the connector. An upper threaded member 38 allows for the connection of an electrical cable (not shown).

The probe body 2 is filled with an electrically insulating epoxy potting material which is used to hold the studs 16 and 18 in place. The epoxy is also used to secure a plurality of conductors 40 which electrically connect the studs 16 and 18 and electrode 14 to pins 35 of connector member 32. In practice, the probe assembly is turned upside and the wire-connected metallic studs are positioned within the hollow body 2. The wires 40 extend through the probe body to pins 35. The epoxy is then poured into the body and set aside to cure. The epoxy potting material thus both secures the studs firmly within the probe housing and also serves to electrically insulate the electrodes from one another. After the epoxy has cured, a rubber gasket 42 is positioned and secured to the bottom edge of the epoxy. The gasket has holes for allowing the studs to extend therethrough and provides a fluid-tight seal when the test and reference electrodes are screwed tightly into place.

FIG. 4 illustrates another embodiment of the corrosion probe assembly in which only the lower electrode portion is shown. Electrode 14' is a cylindrical rod attached to a third stud 17 in a similar fashion as electrodes 10 and 12. In this configuration the three electrodes are preferably made of different diameters and if desired, different lengths. In this manner it will be impossible to mix up the electrodes since the studs 16, 17 and 18 will mate only with the test, auxiliary and reference electrodes, respectively. The different shapes of the electrodes facilitates positive identification during inspection for wear and during replacement.

FIG. 5 shows a bottom view of the probe assembly of FIG. 4. Electrodes 10, 12 and 14' are shown as arranged along a straight line with edge 20 of reference electrode 12 closely positioned relative to test electrode 10. Of course, other arrangements of the electrodes are possible, such as a triangular arrangement, as long as the test and reference electrodes are in close proximity as illustrated.

FIG. 6 shows a bottom view of another embodiment of the electrode configuration. In this case a triangular arrangement of electrodes is shown. In this embodiment, however, the reference electrode 12' is a straight, cylindrical rod and an end 50 of the test electrode 10' is bent toward the reference electrode surface 12.

Although the invention has been described by way of the preferred embodiment, it is understood that the description is by way of illustration only, and it is contemplated that modifications and variations may be made by those skilled in the art without departing from the spirit of the invention.

What is claimed is:
1. A corrosion probe assembly comprising:
 a housing,
 an electrical connector on said housing,
 first, second, and third electrodes secured to said housing, one of said electrodes being bent at a generally right angle toward another of said electrodes whereby an end of said one electrode is positioned in close proximity to said other electrode whereby the solution IR drop is minimized, and
 conductors extending from said electrodes to said electrical connector.
2. A corrosion probe assembly as defined in claim 1 wherein at least two of said electrodes are of different diameters.
3. A corrosion probe assembly as defined in claim 2 wherein at least two of said electrodes are of different lengths.
4. A corrosion probe assembly as defined in claim 1 wherein said third electrode is an annular shroud surrounding said housing.
5. A corrosion probe assembly as defined in claim 1 wherein said bent electrode is bent at substantially 90°.
6. A corrosion probe assembly as defined in claim 1 wherein at least two of said electrodes are of different metallic compositions.
7. A corrosion probe assembly comprising:
 a housing having two ends,
 an electrical connector on one end of said housing,
 an electrically insulating material within said housing having a surface at the other end of said housing,
 at least two threaded conducting members embedded in said insulating material, one end of each member extending through the surface of said insulating material,
 two electrodes threadably secured to each of said ends of said members, wherein one of said electrodes has an angular bend of about 90° whereby one end of said electrode is bent toward another of said electrodes,
 a third electrode on said other end, and
 conductors extending from said threaded members and said third electrode through said insulating material to said electrical connector.
8. A corrosion probe assembly as defined in claim 7 wherein said probe assembly includes a gasket material disposed between said electrodes and said surface of said insulating material for forming a fluid-tight seal.
9. A corrosion probe assembly as recited in claim 7 wherein said third electrode surrounds said housing.
10. A corrosion probe assembly as recited in claim 7 wherein said probe assembly includes a third conducting member embedded in said insulating material and said third electrode is secured to said third conducting member.

References Cited
UNITED STATES PATENTS

| | | | |
|---|---|---|---|
| 3,558,462 | 1/1971 | Wilson | 204—195 C |
| 3,660,249 | 5/1972 | Townsend | 204—1 T |
| 3,181,361 | 5/1965 | Bell | 324—71 R |
| 3,250,689 | 5/1966 | Seyl | 204—1 T |
| 3,632,495 | 1/1972 | Watson et al. | 204—195 C |

GERALD L. KAPLAN, Primary Examiner

U.S. Cl. X.R.

324—71 R